United States Patent [19]

Spiro et al.

[11] 4,198,455

[45] Apr. 15, 1980

[54] TRIM AND MOLDING STRIP AND THE METHOD OF FORMING SAME

[75] Inventors: Earl M. Spiro, Chicago; Basil J. Falcone, Lake Forest, both of Ill.

[73] Assignee: Pan American Gyro-Tex Corporation, Bensenville, Ill.

[21] Appl. No.: 971,994

[22] Filed: Dec. 21, 1978

[51] Int. Cl.² .................... B32B 3/00; B32B 21/08
[52] U.S. Cl. .................................. 428/126; 52/288; 156/211; 156/257; 156/268; 428/156; 428/192
[58] Field of Search ............... 156/209, 211, 257, 268; 52/287, 288; 428/68, 126

[56] References Cited

U.S. PATENT DOCUMENTS

| | | | |
|---|---|---|---|
| 2,246,660 | 6/1941 | Bawtenheimer | 156/211 |
| 2,542,860 | 2/1951 | Clements | 52/741 X |
| 2,674,768 | 4/1954 | Everhart et al. | 52/631 X |
| 2,708,296 | 5/1955 | Soehner | 156/209 X |
| 2,774,410 | 12/1956 | Davies | 156/211 X |
| 3,022,207 | 2/1962 | Lang | 156/257 X |
| 3,090,087 | 5/1963 | Miller | 52/288 |
| 3,200,547 | 8/1965 | Johnson | 52/127 X |
| 3,389,033 | 6/1968 | Ullman, Jr. | 156/216 |
| 3,635,787 | 1/1972 | Shanok et al. | 156/211 X |
| 3,778,337 | 12/1973 | Mand et al. | 428/310 X |

FOREIGN PATENT DOCUMENTS

808863  3/1969  Canada .................................. 428/126

*Primary Examiner*—Henry F. Epstein
*Attorney, Agent, or Firm*—Arnstein, Gluck, Weitzenfeld & Minow

[57] ABSTRACT

A trim and molding strip is formed of a plywood substrate covered by an overlay film of flexible decorative material and includes a longitudinally extending V-shaped groove the apex of which terminates at the overlay film which functions as a hinge to facilitate bending of the strip into and around corners. In the method of fabricating the strip pressure is applied to the groove by a roller to reform and size the groove to obtain accurate registration of the sides of the groove when the strip is bent.

2 Claims, 7 Drawing Figures

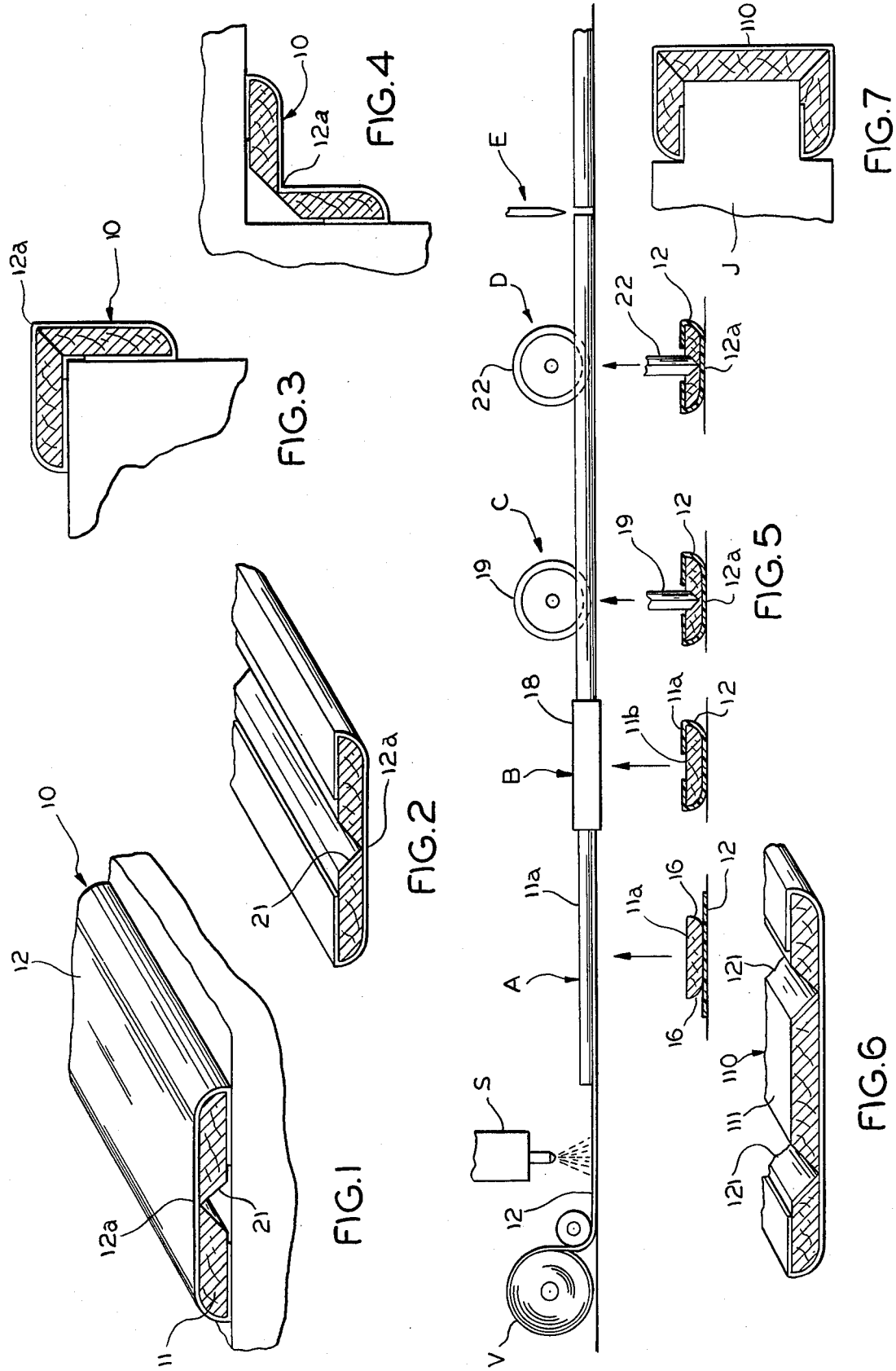

TRIM AND MOLDING STRIP AND THE METHOD OF FORMING SAME

BACKGROUND OF THE INVENTION

This invention relates to a trim and molding strip adapted to be used in flat condition or bent around or into corners and to a method of fabricating the same.

STATEMENT OF THE INVENTION

The present invention contemplates a trim and molding strip comprising a core or substrate of plywood covered by an overlay film of suitable flexible decorative material. The rearward surface of the core is provided with one or more longitudinally extending V-shaped grooves, the angle formed within each groove being substantially 90 degrees. The groove extends inwardly through the core but terminates at the overlay film which functions as a hinge to facilitate bending of the molding strip into and around corners.

The method of fabricating the strip according to the present invention isures that the groove will terminate exactly at the overlay so as to permit a proper hinge functioning.

One of the objects of the present invention is the provision of a decorative molding strip which is useful for application either to a plane surface in flat condition or to both inside and outside angular surfaces of rooms, doorways and the like.

Another object of this invention is the provision of a method of fabricating a molding strip of the foregoing character which insures the correct thickness of the hinge area for proper hinge functioning.

Other and further objects and advantages of this invention will become apparent from the following description when considered in connection with the accompanying drawings.

BRIEF DESCRIPTION OF THE DRAWINGS

FIG. 1 is a fragmentary perspective view of one end of a trim and molding strip embodying the invention and formed according to the method forming a part of this invention.

FIG. 2 is a view similar to FIG. 1 showing the underside of the strip.

FIG. 3 is a cross sectional detail showing the strip applied to an outside corner.

FIG. 4 is a view similar to FIG. 3 showing the strip applied to an inside corner.

FIG. 5 is a diagrammatic view showing the several successive steps in the forming operation, according to the method of this invention.

FIG. 6 is a front perspective view of one end of a modified embodiment of the invention, and FIG. 7 is a cross sectional detail showing the embodiment of FIG. 6 applied to a door jamb.

BRIEF DESCRIPTION OF A PREFERRED EMBODIMENT

A preferred embodiment of this invention is illustrated in the accompanying drawing in which the trim strip is designated by the numeral 10. It comprises a core or substrate 11 formed preferably of 3 ply lavan plywood or a non-shorea species having a thickness of substantially 3.6 mm. and a decorative overlay film 12 of polyvinyl chloride or similar thermoplastic material having a thickness of substantially 6 mils. Advantageously the film 12 is processed by rotogravure or other methods to simulate wood grains and other decorative surfaces, such as burlap, floral designs, marble, grass cloths, etc. It will also be understood that the overlay film 12 may be formed from any suitable paper which has been processed, as above, to simulate the above mentioned decorative effects and which is coated with a suitable thermoplastic or waterproofing material.

The core or substrate 11 is cut from a plywood panel, approximately 4 by 8 feet, which first has been belt sanded to remove surface imperfections and to provide a uniform thickness throughout its area with a tolerance of substantially plus or minus 0.005 inches. The panel then is cut longitudinally into sections 11a of desired width ranging from 1½ inches to 3 inches, depending upon the final use and the longitudinal edges 16 of each section 11a are bevelled to form the core 11. Thereafter, the sections 11a are fed into an apparatus such as diagrammatically illustrated in FIG. 5 for further processing. As illustrated, an overlay film is fed from a supply roll V onto a supporting surface Y and adhesive is applied to the upper surface of the film 12, as by a roller or by a spraying apparatus S, as the film moves along the surface Y. At step A, a section 11a is superposed on the film 12 and moves with the film into a forming die 18 (Step B) which wraps the film about the section 11a to cause it to adhere to the bevelled edges and upper surface of the section but leaving a median portion 11b of the section 11a exposed. At step C the exposed section 11b passes under a rotating cutting head 19 which cuts a 90 degree V-shaped groove 21 in the section.

Of course, it would be desirable to cut a V groove in which all of the substrate material would be removed leaving the hinge portion 12a of the overlay material 12 intact. However, it must be recognized that the thickness of the plywood substrate 11 will vary throughout the length of a section, within the range of the accepted tolerances (plus or minus 0.005 inches). Accordingly, the cutting head 19 is adjusted so that it will penetrate the substrate to cut as close as possible to the overlay 12 which forms the hinge portion 12a of the trim strip without rupturing or tearing the overlay. However, under certain conditions some substrate material will remain at the apex of the groove 21 which will interfere with the hinge action so that the bent portions of the strip cannot be made to assume a proper right angle relationship. If the hinge portion 12a is stressed in an attempt to form a right angle the overlay material may crack or craze rendering the strip unsatisfactory for use.

We have found that the critical relief necessary for proper hinge functioning may be obtained by the use of a hydraulically operated pressure roller 22 formed with a peripheral V-shaped head. As seen in FIG. 5 the strip 10 passes under the roller 22 at step D. The function of the roller 22 is to compress any excess substrate material at the apex of the groove 21 immediately adjacent the hinge portion 12a and also along the sides of the groove thereby to reform and size the groove to obtain accurate registration of the sides of the groove so that the bent portions of the strip will assume a proper right angle relationship. The foregoing is effected without in any way injuring the overlay 12.

The sections are severed at station E into desired lengths.

As seen in FIG. 3, the strip 10 is shown applied to an outside corner of a structure while in FIG. 4 the strip 10 is shown applied to an inside corner of a structure. Also, as seen in FIG. 1 the strip 10 is applied in flat condition to a flat surface.

In the modified embodiment illustrated in FIG. 6, the strip 110 has a somewhat greater width than the strip 10 of the first described embodiment shown in FIGS. 1 and 2. The substrate 111 of the strip 110 is provided with two parallel grooves 121 in spaced relation. Each groove 121 is processed exactly as above described in the first embodiment.

As seen in FIG. 7 the strip 110 is applied to a door jamb J in the manner illustrated.

Various changes coming within the spirit of my invention may suggest themselves to those skilled in the art; hence, I do not wish to be limited to the specific embodiments shown and described or uses mentioned, but intend the same to be merely exemplary, the scope of my invention being limited only by the appended claims.

We claim:

1. The method of forming a trim molding strip embodying a thin plywood body capable of being bent to provide a pair of portions extending at a right angle to each other, consisting in adhesively securing an overlay film to the outer face and sides of said body and along the marginal edges of the inner face of said body so as to leave the median area of said inner face uncovered, cutting a V-shaped groove in said inner face along the line of desired bend with the depth of the groove extending substantially to said overlay film, and pressing said groove with a rotating V-shaped pressure roller to size the groove accurately and to bring the apex of the groove into substantial registry with the inner surface of said overlay film.

2. A molding strip formed according to the method of production set forth in claim 1.

* * * * *